United States Patent
Jordan, II

(10) Patent No.: US 8,487,765 B1
(45) Date of Patent: Jul. 16, 2013

(54) METHOD AND SYSTEM FOR A POWER STRIP WITH AUTOMATIC EQUIPMENT DISCONNECT

(71) Applicant: State Farm Mutual Automobile Insurance Company, Bloomington, IL (US)

(72) Inventor: Jackie O. Jordan, II, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/659,014

(22) Filed: Oct. 24, 2012

(51) Int. Cl.
| G08B 13/12 | (2006.01) |
| G08B 13/14 | (2006.01) |
| G06F 1/00 | (2006.01) |
| G06F 11/30 | (2006.01) |
| H01H 35/00 | (2006.01) |

(52) U.S. Cl.
USPC ............ 340/568.3; 340/568.2; 713/340; 307/39; 307/116

(58) Field of Classification Search
USPC ............ 700/1, 297; 713/300, 310, 320, 340; 340/568.2, 568.3; 307/38–39, 116
See application file for complete search history.

(56) References Cited

U.S. PATENT DOCUMENTS

| 5,278,771 | A * | 1/1994 | Nyenya | 700/293 |
| 6,380,852 | B1 * | 4/2002 | Hartman et al. | 340/521 |
| 6,527,721 | B1 * | 3/2003 | Wittrock et al. | 600/446 |
| 7,285,874 | B2 * | 10/2007 | Menas et al. | 307/80 |
| 7,961,111 | B2 * | 6/2011 | Tinaphong et al. | 340/638 |
| 2006/0129253 | A1 * | 6/2006 | Menas et al. | 700/22 |
| 2007/0155349 | A1 * | 7/2007 | Nelson et al. | 455/128 |
| 2009/0207034 | A1 * | 8/2009 | Tinaphong et al. | 340/635 |
| 2009/0249408 | A1 * | 10/2009 | Smallhorn | 725/75 |
| 2011/0040785 | A1 * | 2/2011 | Steenberg et al. | 707/769 |
| 2011/0202293 | A1 * | 8/2011 | Kobraei et al. | 702/62 |
| 2011/0213510 | A1 * | 9/2011 | Mozayeny | 700/297 |
| 2011/0271131 | A1 * | 11/2011 | Lefebvre et al. | 713/323 |
| 2011/0298301 | A1 * | 12/2011 | Wong et al. | 307/116 |
| 2012/0086272 | A1 * | 4/2012 | Chen et al. | 307/38 |
| 2012/0198246 | A1 * | 8/2012 | German et al. | 713/300 |
| 2012/0201508 | A1 * | 8/2012 | Binder | 386/230 |
| 2012/0294620 | A1 * | 11/2012 | Meyer et al. | 398/106 |
| 2012/0302219 | A1 * | 11/2012 | Vang | 455/414.1 |

OTHER PUBLICATIONS

Monster Power Home Theater Reference HTS 3600MKII Power Center, User's Guide/Manual, pp. 1-56, 2004.*
Conserve Switch™ 2012 Belkin International, Inc., www.belkin.com/us/P-F7C01008, 3 pages.

* cited by examiner

*Primary Examiner* — Ramesh Patel
(74) *Attorney, Agent, or Firm* — Marshall, Gerstein & Borun LLP; Randall G. Rueth

(57) ABSTRACT

A power strip may automatically disconnect a wired connection in response to received weather alert data based on a configuration file including one or more user preference settings. The power strip may include a receiver for a National Weather Service Specific Area Message Encoding system message including an alert type. The power strip may process the message and disconnect a wired connection based on the preference settings. A timer function may also define a time period that the power strip monitors its receiver for weather alert data and automatically disconnects and reconnects the wired connections.

20 Claims, 6 Drawing Sheets

METHOD AND SYSTEM FOR A POWER STRIP WITH AUTOMATIC EQUIPMENT DISCONNECT

TECHNICAL FIELD

The present disclosure generally relates to an electrical power strip that automatically disconnects electronic equipment by using alerts issued by weather alert systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Each year, lightning-induced transient voltage and current cause millions of dollars in damage to electronic equipment. While surge protectors offer significant protection against this type of damage, they are not effective in all cases such as a direct lightning strike to the power line. The most effective protection is to physically unplug the equipment from the power socket as well as disconnect phone, coaxial cable or other connections.

However, thunderstorms and related weather events often occur when the homeowner is away or asleep making physical unplugging of equipment impossible. A weather alert system generally refers to a meteorological agency that issues weather alerts to warn citizens of approaching dangerous weather. For example, the National Weather Service (NWS) uses an automated radio system called Specific Area Message Encoding (SAME) to broadcast alerts for severe weather conditions such as thunderstorms or tornados that are affecting a local area. Each local area SAME system has a particular broadcast frequency. Weather radios tuned to a local SAME frequency may be equipped to receive and process signals from such systems.

SUMMARY

The features and advantages described in this summary and the following detailed description are not all-inclusive. Many additional features and advantages will be apparent to one of ordinary skill in the art in view of the drawings, specification, and claims hereof.

In some embodiments, a power strip may automatically disconnect and reconnect a wired connection. The power strip may include one or more outlets each providing a wired connection to an electronic device and a control module. The control module may include a processor and a memory, wherein the memory stores one or more functions that are executable by the processor. The functions of the control module may include a receiver function to receive weather alert data and a controller function to disconnect the wired connection based on the received weather alert data.

In further embodiments, a method may disconnect an electronic device having a wired connection to a power strip in response to weather alert data. The method may receive weather alert data including an alert type at a computer. The method may also use a computer to determine the alert type from the received weather alert data, and cause the computer to automatically disconnect the wired connection based on the alert type.

In still further embodiments, a power strip may automatically disconnect and reconnect a wired connection to an electronic device. The power strip may include one or more outlets each providing a wired connection to an electronic device. The wired connections may provide one or more of an electrical power, a telephone, or a coaxial cable connection to the electronic device. The power strip may also include a configuration file including one or more user preference settings, and a control module including a processor and a memory, wherein the memory stores a configuration file and one or more functions that are executable by the processor. The control module functions may include a receiver function to receive a radio signal from a National Weather Service Specific Area Message Encoding system. The radio signal may include weather alert data that includes one or more of an event type, an alert type, a location, or an event duration. The alert type may include an advisory, a watch, or a warning. The memory may additionally store a relay switch function, and the preference settings may include one or more user preference settings that define conditions for the control module to cause the relay switch function to disconnect the wired connection to the power strip based on the received alert type and the user preference settings.

Figure 1A:
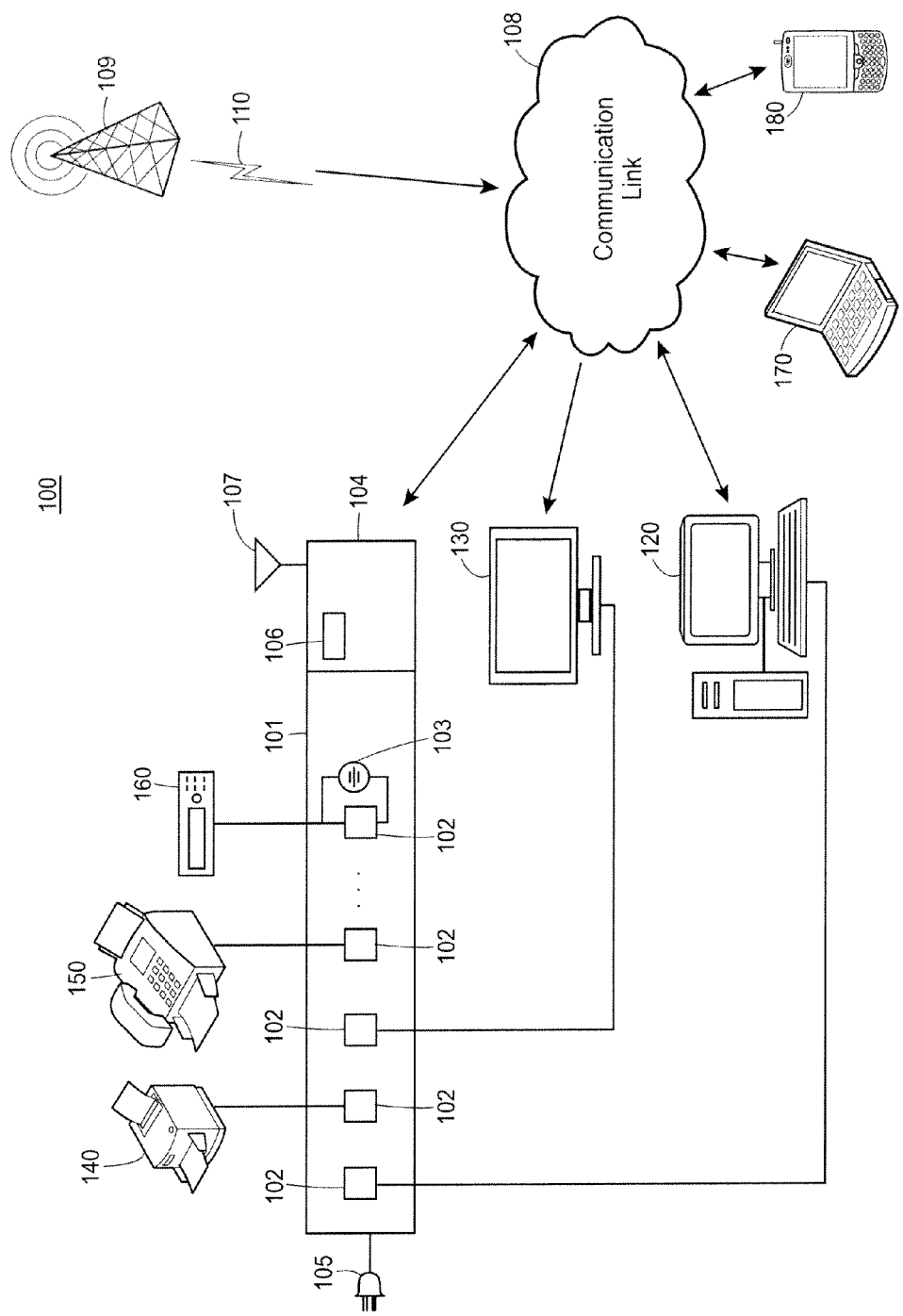
FIG. 1A illustrates one embodiment of a system including a power strip that automatically disconnects plugged-in equipment by using weather alerts received from a weather alert system.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A power strip may have outlets to provide connection for power, phone, coaxial cable, and other wired connections. In one embodiment, the power strip may also include a radio antenna and receiver housed in a control module that continuously monitors for alerts that are locally broadcast by a weather alert system (e.g., NWS's SAME system) in the same area as the power strip. In other embodiments, a power strip may include pre-set or user-configured location data or a Global Positioning System (GPS) receiver to indicate a location of the power strip. Thus, a power strip tuned to a local NWS frequency may receive alert data that is relevant for the location of that power strip. Similarly, a power strip having a location indication (e.g., pre-set, user-configured, or GPS location data) may determine whether received weather alert data includes location data indicating that the alert is relevant to the current location of the power strip. Once an alert for the location of the power strip is received, the type and content may be identified. If the alert is an advisory or watch, then the power strip may communicate the alert to the user. If the alert is a warning, then the power strip may communicate the alert to the user and may also automatically disconnect equipment plugged into the power strip. This disconnect has the same effect as physically unplugging the equipment from the power socket and disconnecting the phone, coaxial cable and other lines.

In some embodiments, the user may be notified of an alert through preference settings selected by the user. For example, the user may choose to be notified via visual indicators mounted on the power strip such as LED lights, or the user may choose to be notified via peripheral equipment such as a PC, or the user may choose to be notified via remote equipment such as a mobile device. A request for user response may also be selected by the user to be included in certain notifications sent. For example, an email message may be sent via a computer network to the PC, or a text message may be sent via a cellular telephone network to the mobile device indicating that a thunderstorm warning alert was received. Upon viewing the email or text message, the user may respond with an instruction to override the subsequent automatic equipment disconnect by sending a further email or text message to the power strip via a network. However, if no user response is detected within a specified time period, or if the user has configured the power strip to shut off connections, then the power strip may proceed to automatically disconnect equipment from the power, phone, coaxial cable and other lines.

In some embodiments, the user may also set up a timer to run the power strip. The timer may be used when the user is away from home and unavailable such as being on vacation, or when the user is unavailable at home, such as being asleep. When running the timer, either a watch or warning alert will trigger an automatic equipment disconnect. The power strip may communicate the received alert to the user via preference settings selected by the user. Depending on the selected preference settings, a request for user response may or may not be included in any notification sent. As well, a user response may or may not be processed. The run time for the timer may also be defined by the user in the preference settings.

In some embodiments, preference settings may be pre-set at a factory such that user selection is not required or allowed. For example, the power strip may be pre-set to notify the user of an alert via a means determined at the factory, or the power strip may be pre-set to automatically request a user response for the alert, or the power strip may be pre-set to run a timer for a pre-determined run time.

Once the power strip ascertains the threatening weather event has passed, as determined from an event duration time in the alert, or upon receiving another alert indicating that the threatening weather event has passed, the power strip may automatically reconnect electronic equipment to the power, phone, coaxial cable or other lines. Thus, damage to sensitive equipment may be avoided by electrically disconnecting and isolating it from electrical power, telephone communications, coaxial cable, and other wired connections before any threatening weather event such as a lightning strike hits the area.

One or more of the outlets on the power strip may also have a built-in battery back-up source, which would deliver uninterrupted power to equipment with program timers (e.g., a DVR) to prevent programming information from being lost during periods of disconnect.

With reference to FIG. 1A, a system 100 for automatically disconnecting plugged-in equipment may include a power strip 101 having multiple outlets 102 to provide connection for power, phone, coaxial cable, and other wired connections. In one embodiment, the multiple outlets 102 may provide power connection to allow a user to plug in various electronic equipment such as a PC 120, a TV 130, a printer 140, a fax machine 150 and a DVR 160. One or more of the outlets 102 providing power connection may have a built-in battery back-up source 103, which would deliver uninterrupted power to equipment with program timers such as the DVR 160 to prevent programming information from being lost during periods of disconnect. Extending from the power strip 101 is a cord and plug 105 for delivering AC power or other power, data, etc., to the power strip 101.

The power strip 101 may include a control module 104 having a receiver 106 and an antenna 107 for receiving signals (e.g., radio, Wi-Fi, cellular, computer network, etc.) containing weather alert data 110 from weather alert systems 109 (e.g., the NWS's SAME system) via a communication link 108. The receiver may include In addition to receiving weather alert data 110, the receiver 106 may also receive global positioning system (GPS) data indicating a geographic location of the power strip 101. The control module 104 may communicate the received alert data to peripheral equipment via the communication link 108. In one embodiment, the control module 104 may communicate alert data to the TV 130 via an HDMI connection. In another embodiment, the control module 104 may communicate with the PC 120 via a suitable network connection (e.g., local area network, a wide area network, a wired or wireless network, a private network, etc.). The control module 104 may also communicate the alert data with other remote equipment via the communication link 108 or another link. In one embodiment, the control module 104 may communicate with a remote PC 170 or a mobile device 180 via a suitable network connection (e.g., local area network, a wide area network, a wired or wireless network, a mobile network, etc.).

Figure 1B:
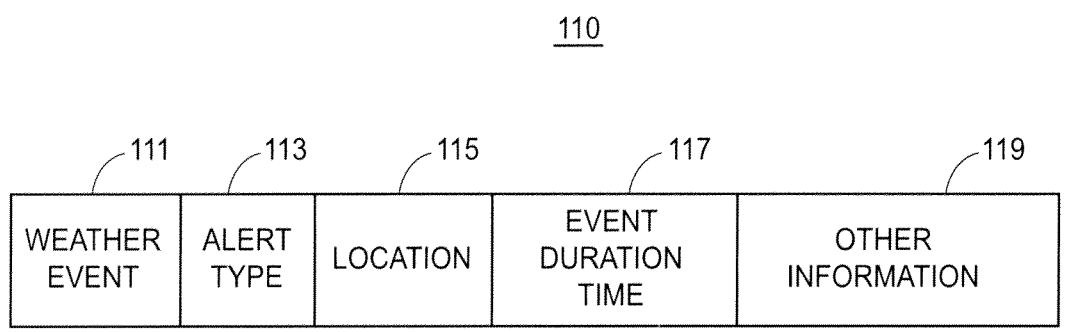
FIG. 1B illustrates one embodiment of a data structure for received weather alert data.

With reference to FIG. 1B, the received weather alert data 110 may include information concerning a threatening weather event 111 (e.g., a thunderstorm, tornado, hurricane, earthquake, tidal wave, flood, etc.), a type of alert 113 (e.g., an advisory, watch or warning), a location 115, an event duration time 117, and other information 119. The location 115 may include one or more global positioning system coordinates indicating an area for the weather alert.

Figure 2:
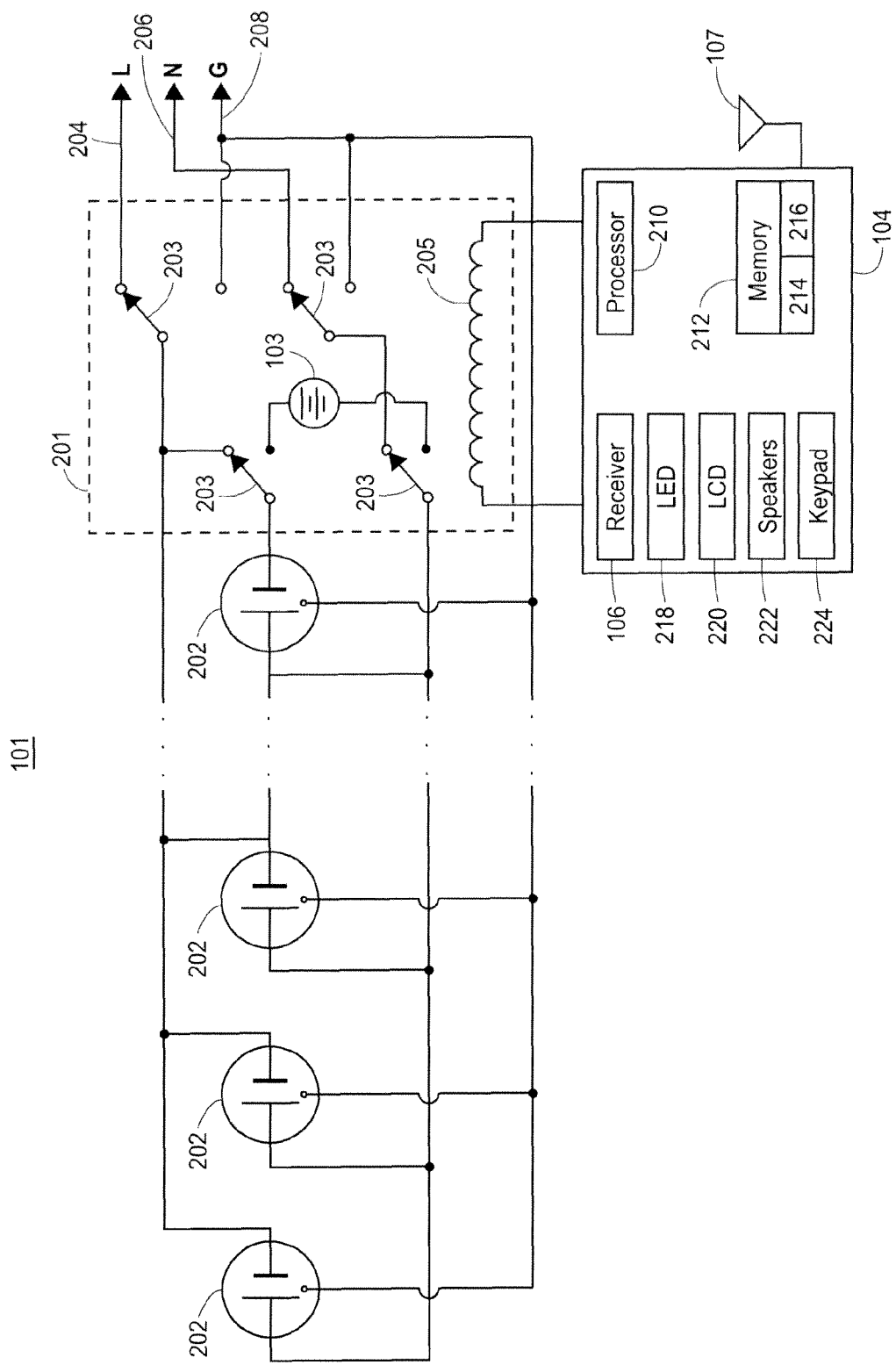
FIG. 2 illustrates one embodiment of a wiring diagram for the power strip.

With reference to FIG. 2, an embodiment of a wiring diagram for the power strip 101 to provide power connection may include a live wire 204, a neutral wire 206 and a ground wire 208 arranged to form electrical connectors 202 which would provide power connection for the outlets 102 in FIG. 1A. The control module 104 may automatically disconnect the electrical connectors 202 from the power line. In one embodiment, the control module 104 may route the live wire 204 and the neutral wire 206 to the ground wire 208 through switches 203 activated by a solenoid 205 or other activation methods in the isolation relay 201. At the same time, one or more of the electrical connectors 202 may be connected to the built-in battery back-up source 103 through switches 203 in the same isolation relay 201 to prevent power loss to equipment with program timers. After the weather event duration time from the alert data has passed, upon receiving another alert indicating that the event has passed or another indication, the control module 104 may automatically reconnect the electrical connectors 202 to the power line and may disconnect one or more of the electrical connectors 202 from the built-in battery back-up source 103. In some embodiments, the control module 104 may disconnect the electrical connectors 202 through switches 203 in the isolation relay 201.

In general, the control module 104 may include a computer processor 210 and a computer-readable memory 212 that stores computer instructions which may be executable on the processor 210. The memory 212 may include instructions 214 to execute control module functions as described in relation to FIG. 3. The memory 212 may also include instructions 216 to execute methods as described in relation to FIG. 4.

Figure 3:
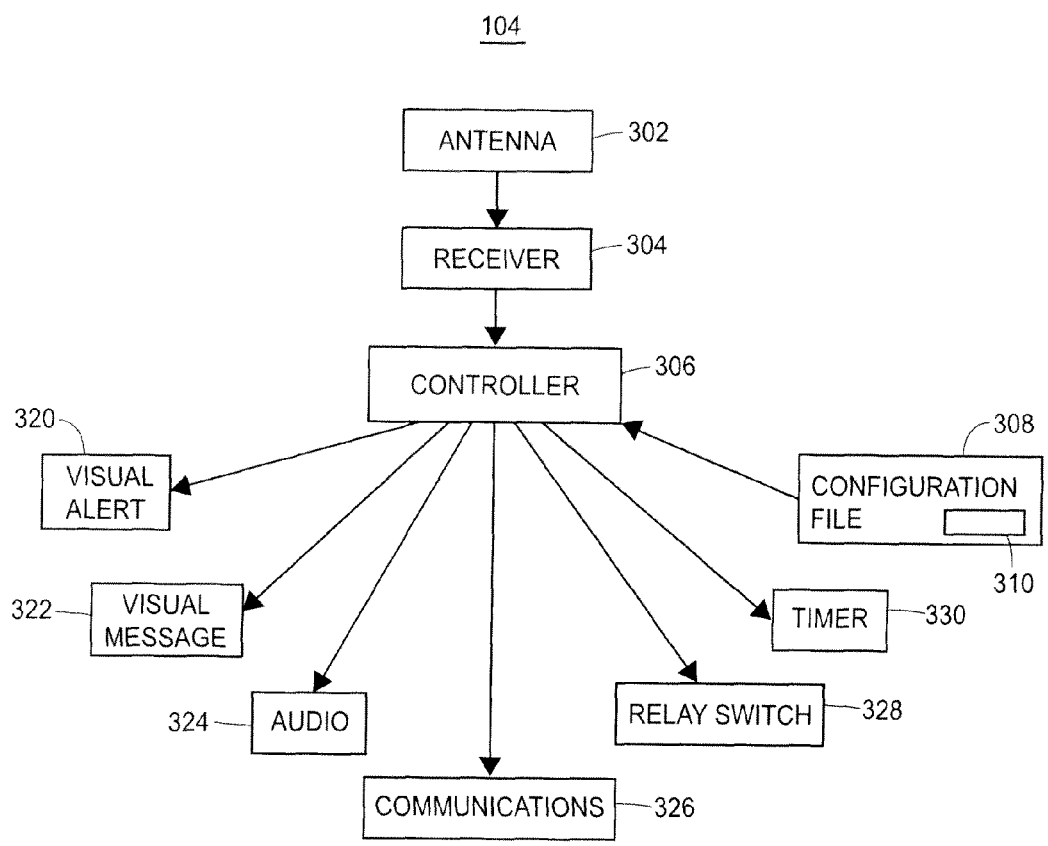
FIG. 3 illustrates one embodiment of various functions that may be used by the control module on the power strip.

With reference to FIG. 3, the control module 104 may include various components and functions. According to one embodiment, the control module 104 may include an antenna function 302 which controls the receiver 106 and antenna 107 to capture signals including weather alert data 110 (e.g., alert from the NWS's SAME system), a receiver function 304 which controls the receiver 106 to receive and decode the signals, and a controller function 306 to process the signals. The controller function 306 may control other functions such as a visual alert function 320, a visual message function 322, an audio function 324, a communications function 326, a relay switch function 328 and a timer function 330. The controller function 306 may execute functions through a user-defined configuration file 308 which includes preference settings 310 selected by the user. In some embodiments, the controller function 306 may execute functions through preference settings pre-set at a factory that do not require or allow user selection.

In embodiments that require or allow user selections, preference settings 310 selected by the user may indicate conditions for the control module 104 to automatically disconnect and reconnect a wired connection to the power strip and perform other actions in response to received weather alert data 110. For example, where the preference settings 310 indicate a local NWS frequency and the alert data 110 is received from that frequency, then the controller function 306 may execute one or more other functions based on other preference settings 310. Further, where the preference settings 310 indicate a location for the power strip (e.g., a location set by default, by user input, or by received GPS signals) and the received weather alert location data 115 indicates that the data is relevant for the location of the power strip, then the controller function 306 may execute one or more other functions based on other preference settings 310. In some embodiments, the controller function 306 may execute the visual alert function 320 to flash LED lights or activate another visual indicator of an alert. In one embodiment, the visual alert function 320 may activate differently colored LED lights 218 (FIG. 2) which may be mounted on the control module 104. For example, a green LED light may flash when an advisory alert is received, or a yellow LED light may flash when a watch alert is received, or a red LED light may flash when a warning alert is received. The controller function 306 may also execute the visual message function 322 to display a visual message. In one embodiment, an LCD panel 220 (FIG. 2) may be mounted on the control module 104 which displays a message indicating the reception of an alert. As well, the controller function 306 may execute the audio function 324 to send out an audio message. In one embodiment, speakers 222 (FIG. 2) may be mounted on the control module 104 which broadcasts an audio message indicating that an alert was received. For example, the audio message may announce that a warning alert for a thunderstorm in the area was received.

Further, the controller function 306 may execute the communications function 326 to communicate the received alert to the user via peripheral and remote equipment. In one embodiment, the controller function 306 may send a video message to the TV 130 indicating the reception of an alert. For example, the video message may show a video of a thunderstorm and announce that a warning alert for a thunderstorm was received. In another embodiment, the controller function 306 may send an email message to the PC 120 or the remote PC 170 indicating that an alert was received. The email message may request a response from the user, which the user may respond to by causing the receiving device to send a further email message containing an instruction to the controller function 306. The request for user response may be a preference setting 310 that may be defined by the user in the configuration file 308. In still another embodiment, the controller function 306 may send a text message to the mobile device 180 indicating that an alert was received and may request a user response. Upon receiving the text message, the user may cause the receiving device to respond by sending an instruction to the controller function 306 in a further text message.

In some embodiments, to automatically disconnect the equipment from the power line, the controller function 306 may execute the relay switch function 328 to disconnect the electrical connectors 202, which at the same time may connect one or more of the electrical connectors 202 to the built-in battery back-up source 103. To automatically reconnect the equipment to the power line, the controller function 306 may again execute the relay switch function 328 to reconnect the electrical connectors 202 and disconnect one or more the electrical connectors 202 from the built-in battery back-up source 103.

The controller function 306 may execute the timer function 330 to run a timer, which indicates the user is either away from home and unavailable (e.g., on vacation) or unavailable at home (e.g., asleep). The user may define the run time for the timer through a preference setting 310 of the configuration file 308.

Figure 4:
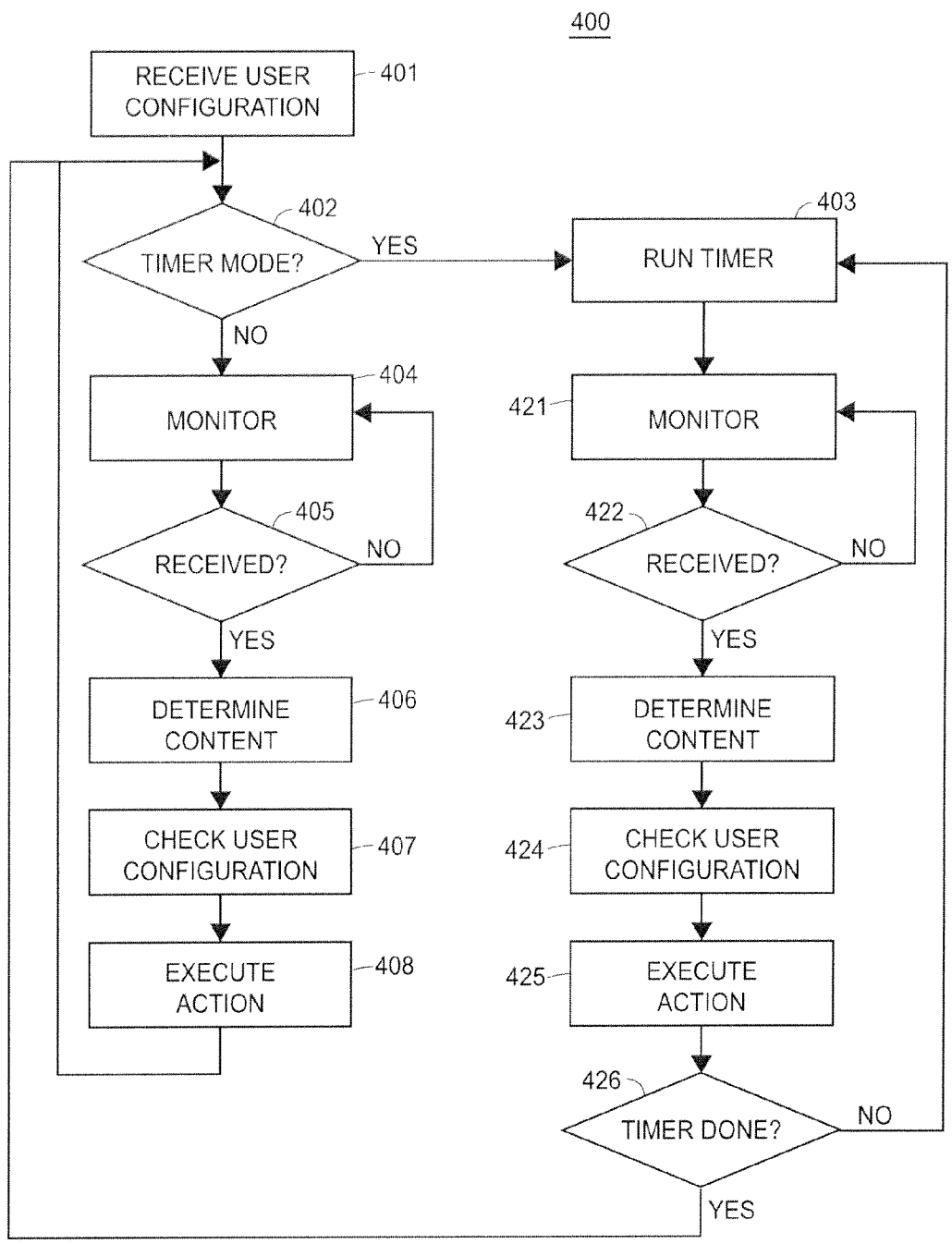
FIG. 4 illustrates one embodiment of a flowchart for a method that automatically disconnect plugged-in equipment on the power strip.

With reference to FIG. 4, the system 100 described herein may be employed in a method 400 to receive alert data (e.g., alert from the NWS's SAME system) and execute actions based on those alerts. The method 400 may include one or more routines in the form of non-transitory computer-executable instructions (e.g. the computer instructions 216) that are stored in a tangible computer-readable storage medium (e.g., the control module memory 212) and executed using a processor (e.g., the control module processor 210).

The automatic equipment disconnect method 400 may receive preference settings selected by the user which are stored as preference settings 310 in the configuration file 308 (block 401). In some embodiments, the user may enter the preference settings 310 through a keypad 224 (FIG. 2) mounted on the control module 104. In other embodiments, the user may configure the preference settings 310 by remotely accessing the configuration file 308 through a computing device (e.g., a PC) or a mass storage device (e.g., a USB device) via a network. The preference settings 310 may indicate a NWS frequency corresponding to the location of the power strip for the antenna function 302. Additionally, the settings 310 may indicate actions that may be performed upon receiving alert data (e.g., alert from the NWS's SAME system). The preference settings 310 may also indicate whether a timer mode has been selected by the user.

Next, the method 400 may determine whether the timer mode has been selected (block 402). If the timer mode has been selected, then the method 400 may begin a timer mode operation (block 403). If the timer mode has not been selected, then the method 400 may begin a normal mode operation (block 404).

In the normal mode operation (block 404), the method 400 may continuously monitor for alert data 110 (e.g., alert from the NWS's SAME system) by continuously accessing the receiver 304 and antenna function 302 to allow the antenna 107 to continuously capture radio signals.

The method 400 may then determine whether the receiver 106 and antenna 107 have captured alert data or any signals of interest (block 405). The method 400 may access the receiver function 304 to allow the receiver 106 to receive and decode any captured data. In some embodiments, the captured data or signal is alert data 110 such as a signal from the NVVS's SAME system and the antenna function 302 processes signals received on a frequency indicated by the preference settings 310. For example, the frequency may correspond to a frequency for a NWS system 109 nearest the geographic location of the power strip. In other embodiments, the captured data or signal is alert data 110 that includes location data 115, which is retrieved by parsing the received alert data 110. The method 400 may also determine a power strip location from the preference settings 310. In some embodiments, the power strip location is determined from received GPS location data, or from another indication of the power strip location (e.g., user-entered location such as a zip code, street address, city, etc., or a default location). Once the method 400 determines both the alert location 115 and the power strip location, the method 400 may then compare these two locations to determine whether the received alert data 110 is relevant for the location of the power strip. If the alert data 110 is relevant, then the method 400 may proceed to determine the content of the alert data 110 (block 406). Otherwise, the method 400 may return to continue monitoring for weather alert data 110 (block 404).

The method 400 may access the controller function 306 to determine the content of the received signal or alert data 110 (block 406). For example, the alert data 110 may include the weather event 111, the type of alert 113 (e.g., advisory, watch or warning), the location 115, the event duration time 117 and other information 119. Once the method 400 identifies the alert content, the method 400 may proceed to check user configuration (block 407).

The method 400 may access the configuration file 308 to check the user-defined preference settings 310 in order to execute an action based on the received alert data 110 (block 407). If the received alert data indicates an advisory or watch alert, then the method 400 may cause the communications function 326 to send a notification to the user via one or more preference settings 310. If the received alert data indicates a warning alert, then the method 400 may cause the communications function 326 to send a notification to the user via one or more preference settings 310 and then automatically disconnect equipment from one or more wired connections (e.g., power, phone, coaxial cable and other lines).

In some embodiments, the preference settings 310 may indicate activation of visual indicators mounted on the control module 104 in response to the received alert data 110. In some embodiments, the method 400 may access the controller function 306 to execute the visual alert function 320 and flash the LED lights 218. In other embodiments, the method 400 may cause the visual message function 322 to show a text or other message defined in the preference settings 310. The message may be displayed on the panel 220. In still other embodiments, the audio function 324 may broadcast an audio message defined in the preference settings 110 through the speakers 222. After communicating the alert data to the user, the method 400 may access the controller function 306 to automatically disconnect equipment from a wired connection. For example, the method 400 may execute the relay switch function 328 to automatically disconnect equipment from the power line.

In other embodiments, the preference settings 310 may indicate notification through peripheral equipment (e.g. PC 120, TV 130, etc.) in response to the alert data 110. For example, a user may be present at home and the preference settings 310 may be configured to cause the method 400 to access the controller function 306 and execute the communications function 326 to send out a message via the communication link 108 to one or more peripheral devices. In one embodiment, the preference settings 310 may define a video message to be sent to the TV 130 before disconnecting a wired connection (e.g., executing the relay switch function 328 to automatically disconnect equipment from the power line). In another example, the preference settings 310 may define an email or other message to be sent to the PC 120. A request for user response, which may be a preference setting 310, may also be included in the message sent by the communications function 326. The response request may indicate an option to disconnect or reconnect the wired connection. For example, in response to the received email or other message, the power strip may receive an instruction to override the subsequent automatic equipment disconnection or reconnection in a further email or other message to the controller function 306. However, if the method 400 does not detect a user response with a specified time period, the method 400 may proceed to automatically disconnect equipment from the wired connection.

In still other embodiments, the preference settings 310 may indicate notification through remote equipment (e.g., remote PC 170, mobile device 180, etc.) in response to the received alert data 110. For example, user may be away from home and the preference settings 310 may be configured to cause the method 400 to access the controller function 306 and execute the communications function 326 to send an email or other message to the remote PC 170, or a text or other message to the mobile device 180. A request for user response, which may be a preference setting 310, may be included in the email, text or other message. The response request may indicate an option to disconnect or reconnect the wired connection. In response to the email, text or other message, the method 400 may receive an instruction to override the subsequent automatic equipment disconnection or reconnection in a further email, text or other message to the controller function 306. However, the method 400 does not detect a user response within a specified time period, the method 400 may proceed to automatically disconnect equipment from the wired connection.

Once the method 400 identifies one or more preference settings 310, the method 400 may proceed to carry out the corresponding action (block 408). In some embodiments, after the event duration time 117 of the weather event has passed, or upon receiving another alert indicating that the event has passed, the method 400 may reconnect the wired connection. In some embodiments, the controller function 306 may execute the relay switch function 328 to automatically reconnect equipment back to the power line. After reconnecting the wired connection, the method 400 may continue to determine whether to operate in the normal mode or in the timer mode (block 402).

If the preference settings 310 indicate that the timer mode has been selected, then the method 400 may begin the timer mode operation in which case a timer function may start as specified in the preference settings 310 (block 403). The method 400 may continuously monitor for signals indicating weather alert data 110 (block 421). In some embodiments, the weather alert data 110 includes signals from the NWS's SAME system. The method 400 may determine whether a signal including alert data 110 is received (block 422). If not, the method 400 may return to continue monitoring for weather alert data 110 (block 421). Once a signal is received, method 400 determines the content of the alert in the received signal (block 423), and then proceeds to check the user-defined preference settings 310 in order to execute an action based on the received alert data 110 (block 424). The timer mode may be used when a user is either away from home and available (e.g., on vacation with cellular or other communications access) or unavailable at home (e.g., asleep). If the received alert data indicates an advisory alert, then a user preference setting 310 may indicate notifying the user of the alert. If the alert data indicates a watch or warning alert, then a user preference setting 310 may indicate notifying the user of the alert and then automatically disconnect equipment from the power, phone, coaxial cable and other lines. Depending on preference settings 310, request for user response may or may not be included in any notification sent by the method 400. As described above in relation to the preference settings 310, the method 400 may or may not process a user response to the controller function 306 while in timer mode. The method 400 may carry out an action corresponding to one or more preference settings 310 (block 425). Subsequently, the method 400 may determine if the timer function has finished timing (block 426). If not, the method 400 returns to operate in the timer mode (block 403). If the timer function has finished timing, then the method 400 may continue to determine whether to operate in the normal mode or in the timer mode (block 402).

In some embodiments, the preference settings may be preset at a factory such that user selection is not required or allowed. In this case, the method 400 may execute various functions according to the settings pre-determined at the factory.

Figure 5:
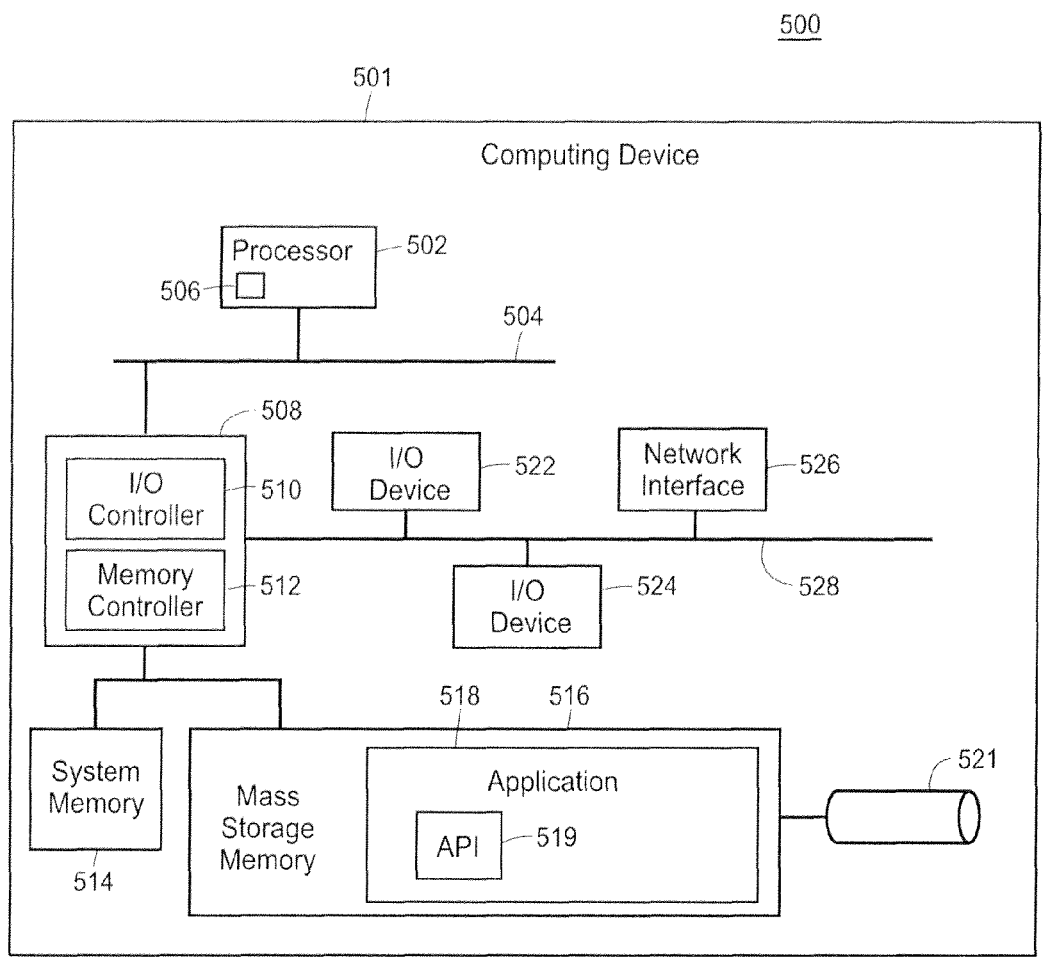
FIG. 5 illustrates a block diagram of a computer to implement the various functions that automatically disconnects plugged-in equipment on the power strip in accordance with the described embodiments.

FIG. 5 is a high-level block diagram of an example computing environment for a system to automatically disconnect equipment from wired connections using received weather alert data 110. In some embodiments, the received alert data 110 may be from the NWS's SAME system. The computing device 501 may include a control module 104, a PC 120, a mobile device 180 (e.g., a cellular phone, a tablet computer, a Wi-Fi-enabled device or other personal computing device capable of wireless or wired communication), or other known type of computing device. As will be recognized by one of ordinary skill in the art, in light of the disclosure and teachings herein, other types of computing devices can be used that have different architectures. Processor systems similar or identical to the example system 500 may be used to implement and execute the example system of FIG. 1A, the various control module functions of FIG. 3, the method 400 of FIG. 4, and the like. Although the example system 500 is described below as including a plurality of peripherals, interfaces, chips, memories, etc., one or more of those elements may be omitted from other example processor systems used to implement and execute the example system 100. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement an application 518 having an API 519 (including functions and instructions as described by the method 400 of FIG. 4), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. In one embodiment, non-transitory program functions, modules and routines (e.g., an application 518) are stored in mass storage memory 516, loaded into system memory 514, and executed by a processor 502 or can be provided from computer program products that are stored in tangible computer-readable storage mediums (e.g. RAM, hard disk, optical/magnetic media, etc.). Mass storage 516 may also include a cache memory 521 storing application data, user profile data, and timestamp data corresponding to the application data, and other data for use by the application 518.

The peripheral I/O controller 510 performs functions that enable the processor 502 to communicate with peripheral input/output (I/O) devices 522 and 524, a network interface 526, via a peripheral I/O bus 528. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The peripheral I/O bus 528 may include support for Wi-Fi network, Bluetooth, Infrared, cellular, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 526 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits.

Using the system 100 and method 400 described herein, a power strip for automatically disconnecting equipment by using received weather alert data from weather alert systems may be implemented to electrically isolate the equipment from wired connections (e.g., power, phone, coaxial cable or other lines) before a threatening weather condition, such as a thunderstorm, hits the area.

The power strip may continuously monitor for threatening weather alert data (e.g., alert from the NWS's SAME system) and upon receiving an alert data, the power strip may notify the user of the alert and then proceed to automatically disconnect equipment from wired connections. The user may also set up a timer to run the power strip. Once the threatening weather has passed as determined from information contained in the alert data, the power strip may automatically reconnect equipment to the wired connections. The power strip may significantly reduce lightning-induced damage to sensitive electronic equipment by automatically disconnecting the equipment without any required physical interaction.

The following additional considerations apply to the foregoing discussion. Throughout this specification, plural instances may implement functions, routines, or operations described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for automatically disconnecting equipment by using received weather alert data from weather alert systems through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

I claim:

1. A power strip for automatically disconnecting and reconnecting a wired connection, the power strip comprising:
   one or more outlets each providing a wired connection to an electronic device;
   a receiver configured to receive weather alert data, wherein the received weather alert data includes a radio signal received from a National Weather Service Specific Area Message Encoding system including:
      an event type including one or more of a thunderstorm, a tornado, a hurricane, an earthquake, a flood, or a tidal wave;
      an alert type including one or more of an advisory, a watch, or a warning;
      a location including one or more global positioning system coordinates indicating an alert area; and
      an event duration; and
   a control module coupled to the one or more outlets and the receiver, the control module including a processor and a memory, wherein the memory stores one or more routines that are executable by the processor, and the control module is configured to disconnect the wired connection based on the received weather alert data.

2. The power strip of claim 1, further comprising a configuration file including one or more user preference settings, wherein the control module is configured to disconnect the wired connection based on the received weather alert data and the user preference settings.

3. The power strip of claim 1, wherein the wired connections provide one or more of an electrical power, a telephone connection, or a coaxial cable connection to the electronic device.

4. The power strip of claim 1, wherein the receiver is configured to receive weather alert data via one or more of a radio antenna, a cellular network antenna, or a computer network interface.

5. The power strip of claim 1, wherein the one or more routines stored in the memory include a visual alert routine and the preference settings define an alert type for the visual alert routine to activate one or more visual indicators on the power strip.

6. The power strip of claim 1, further including a battery back-up for the electronic device.

7. The power strip of claim 1, further comprising a relay switch coupled to the control module and the preference settings define conditions for the control module to cause the relay switch to disconnect or reconnect the wired connection to the power strip.

8. The power strip of claim 1, wherein the one or more routines stored in the memory include a timer routine and the preference settings define a time period for the timer routine to cause the control module to disconnect the wired connection, and expiration of the time period causes the control module to reconnect the wired connection.

9. The power strip of claim 1, wherein the one or more routines stored in the memory further include:
   a visual message routine and the preference settings define a message for the visual message routine to display on a panel of the power strip,
   an audio routine and the preference settings define a sound for the audio routine to broadcast via speakers of the power strip, and
   a communications routine and the preference settings define a message for the communications routine to send to the electronic device via the wired connection and a remote device via a communication link, the message including a response request indicating an option to disconnect or reconnect the wired connection.

10. A method for disconnecting an electronic device having a wired connection to a power strip in response to weather alert data, the method comprising:
   receiving, at a receiver, the weather alert data including:
      a radio signal from a National Weather Service Specific Area Message Encoding system via one or more of a radio signal antenna, a cellular network antenna, or a computer network interface of the power strip, the radio signal includes:
         an event type, the event type includes one or more of a thunderstorm, a tornado, a hurricane, an earthquake, a flood, or a tidal wave:
         an alert type, the alert type includes one or more of an advisory, a watch, or a warning;
         a location; and
         an event duration;
   using a control module coupled to the receiver to determine the alert type from the received weather alert data; and
   causing the control module to automatically disconnect the wired connection based on the received alert type.

11. The method of claim 10, further comprising:
   receiving, at the control module, a configuration file including one or more user preference settings; and
   causing the control module to automatically disconnect the wired connection based on both the received alert type and the user preference settings.

12. The method of claim 11, further comprising activating one or more visual indicators on the power strip in response to determining the alert type based on the received weather alert data.

13. The method of claim 11, wherein the preference settings define a time period for a timer routine to cause the control module to disconnect the wired connection and expiration of the time period causes the control module to reconnect the wired connection.

14. The method of claim 10, wherein the wired connections provide one or more of an electrical power, a telephone connection, or a coaxial cable connection to the electronic device.

15. The method of claim 10, further comprising sending a notification to a remote device via a communication link in response to receiving the weather alert data, the notification indicating an option to disconnect or reconnect the wired connection.

16. A power strip for automatically disconnecting and reconnecting a wired connection to an electronic device, the power strip comprising:
   one or more outlets each providing a wired connection to an electronic device, wherein the wired connections provide one or more of an electrical power, a telephone connection, or a coaxial cable connection to the electronic device;
   a receiver configured to receive weather alert data including a radio signal from a National Weather Service Specific Area Message Encoding system, the radio signal includes:
      an event type, the event type includes one or more of a thunderstorm, a tornado, a hurricane, an earthquake, a flood, or a tidal wave;
      an alert type, the alert type includes an advisory, a watch, or a warning;
      a location; and
      an event duration;
   a relay switch configured to disconnect the wired connection to the power strip; and
   a control module coupled to the one or more outlets, the receiver and the relay switch, the control module including a processor and a memory, wherein the memory stores a configuration file and one or more routines that are executable by the processor,
   wherein the configuration file includes one or more user preference settings that define conditions for the control module to cause the relay switch function to disconnect the wired connection to the power strip based on the received alert type and the user preference settings.

17. The power strip of claim 16, wherein the one or more routines stored in the memory include a timer routine and the preference settings define a time period for the timer routine to cause the control module to disconnect the wired connection, wherein expiration of the time period causes the control module to reconnect the wired connection.

18. The power strip of claim 16, wherein the one or more routines stored in the memory further include a visual alert routine and the preference settings define an alert type for the visual alert routine to activate one or more visual indicators on the power strip.

19. The power strip of claim 16, wherein the one or more routines stored in the memory further include a communications routine and the preference settings define a message for the communications routine to send to the electronic device via the wired connection and a remote device via a communication link.

20. The power strip of claim 19, wherein the message includes a response request indicating an option to disconnect or reconnect the wired connection.

* * * * *